United States Patent [19]

Bush

[11] 4,013,165

[45] Mar. 22, 1977

[54] CONVEYORS

[75] Inventor: Anthony Harry Bush, Ascot, England

[73] Assignee: A. H. B. Services (Engineers) Limited, England

[22] Filed: June 5, 1975

[21] Appl. No.: 584,213

[30] Foreign Application Priority Data

June 5, 1974 United Kingdom .............. 25015/74

[52] U.S. Cl. .............................. 198/817; 198/835; 29/116 R

[51] Int. Cl.² ......................................... B65G 15/10

[58] Field of Search .............. 198/127 R, 129, 190, 198/202, 817, 835, 842; 29/116 R, 125; 64/6, 15 R, 15 C, 27 R, 27 C, 30 R, 30 C

[56] References Cited

UNITED STATES PATENTS

| | | | |
|---|---|---|---|
| 1,472,252 | 10/1923 | Smith ................................. 198/190 |
| 2,446,211 | 8/1948 | Clark ............................... 29/116 R |
| 2,616,274 | 11/1952 | Landrum ........................... 64/27 C |
| 2,650,603 | 9/1953 | Howes ............................. 29/116 R |
| 2,948,646 | 8/1960 | Richardson ..................... 29/116 R |
| 2,987,988 | 6/1961 | Robledano ..................... 198/190 X |
| 3,346,083 | 10/1967 | Bochan .............................. 64/27 R |
| 3,570,653 | 3/1971 | Cullen ................................ 198/190 |
| 3,585,817 | 6/1971 | McCafferty, Jr. et al. ......... 64/30 C |
| 3,729,088 | 4/1973 | Stein et al. ...................... 198/127 R |

Primary Examiner—Johnny D. Cherry
Assistant Examiner—Richard K. Thomson
Attorney, Agent, or Firm—Wenderoth, Lind & Ponack

[57] ABSTRACT

A conveyor of the low density type comprises two spaced-apart roller assemblies around which an endless wire is entrained to form upper and lower flights consisting of parallel spaced-apart wire lengths. Each roller assembly includes grooved discs or pulleys to support the successive lengths of wire of the flights, the pulleys being mounted on a shaft so as to be independently rotatable. A drive to one of the assemblies includes a slipping clutch to an end pulley, and the remaining pulleys are in frictional engagement so that the drive is transmitted to all the pulleys in that assembly.

7 Claims, 3 Drawing Figures

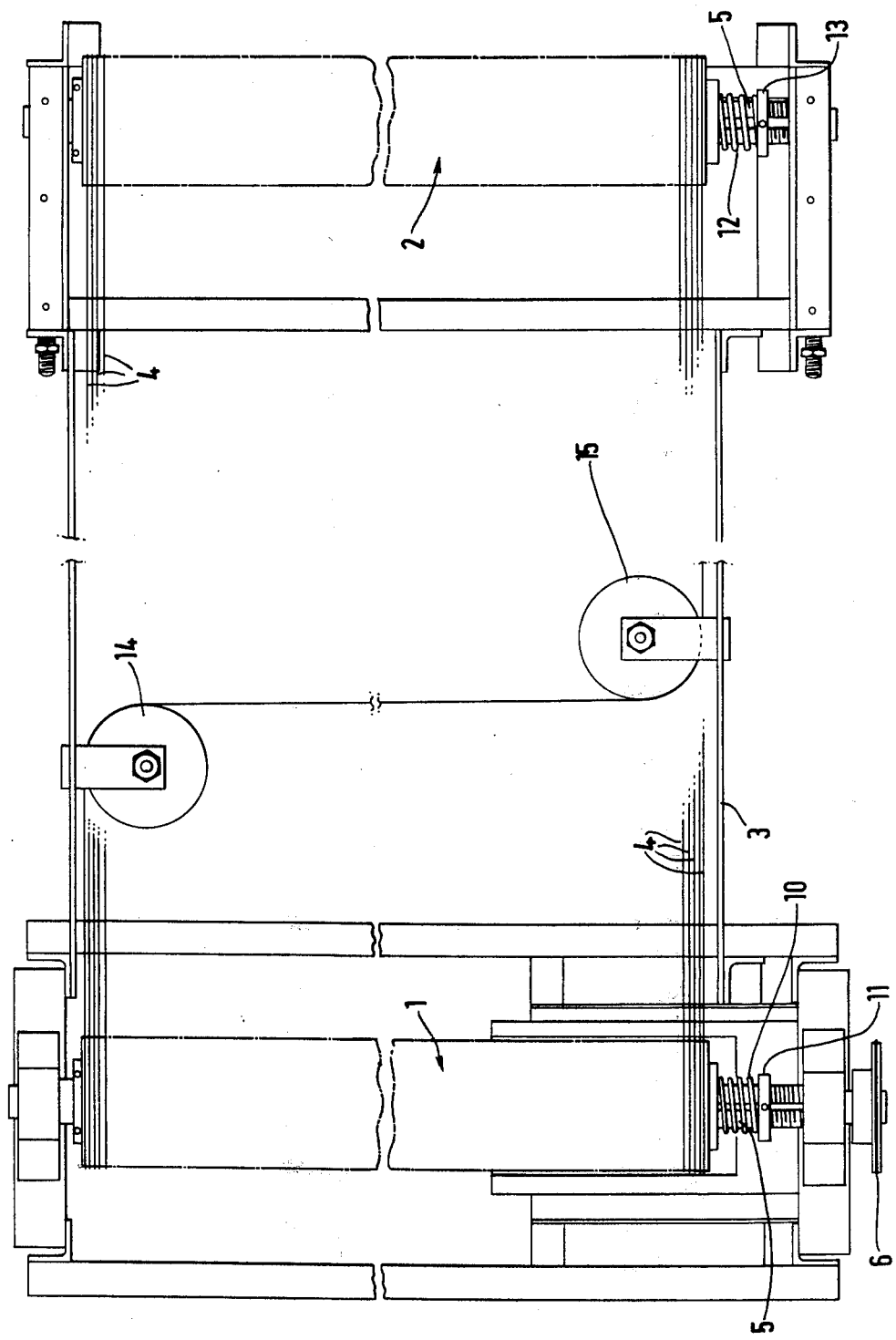

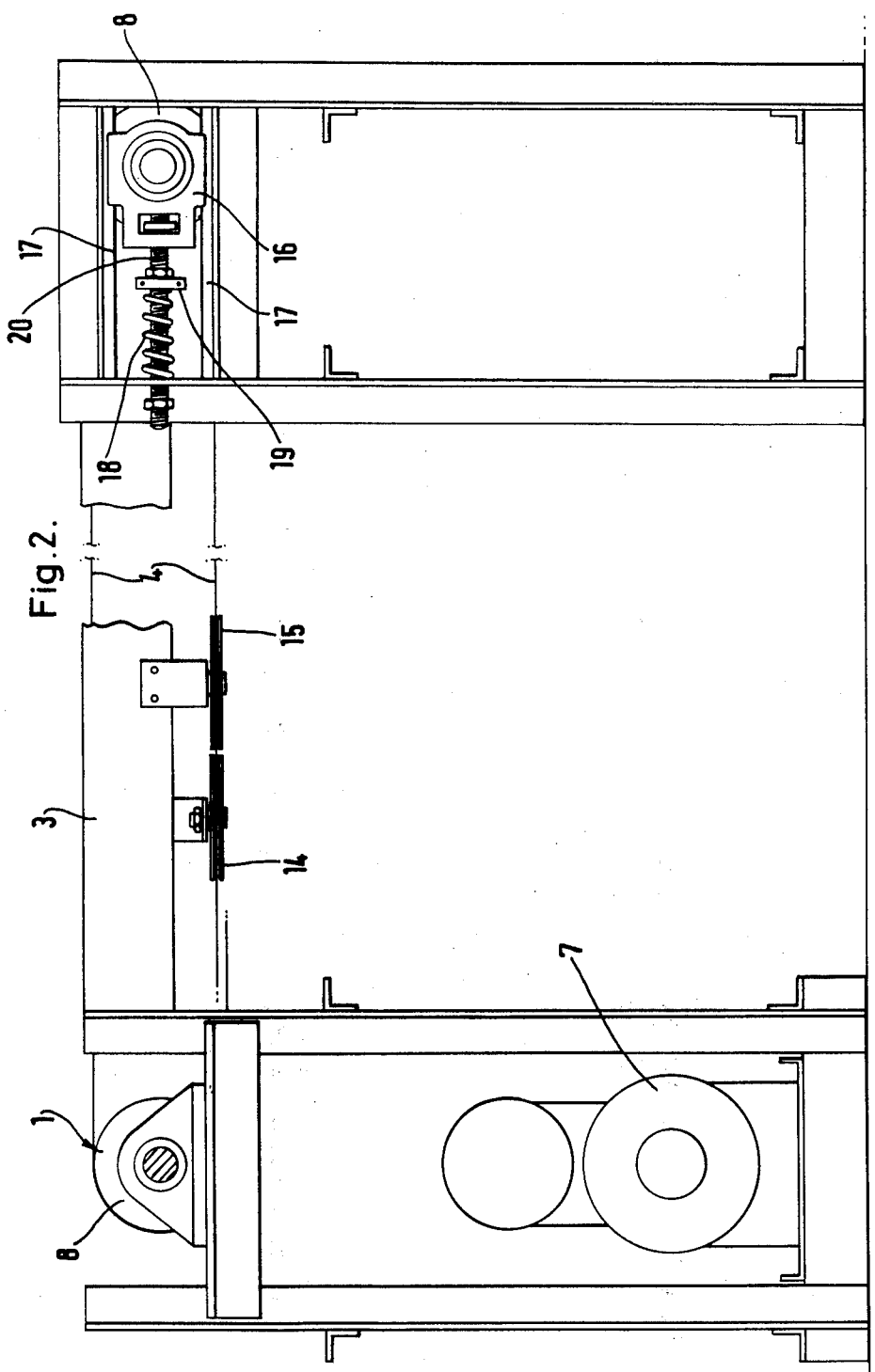

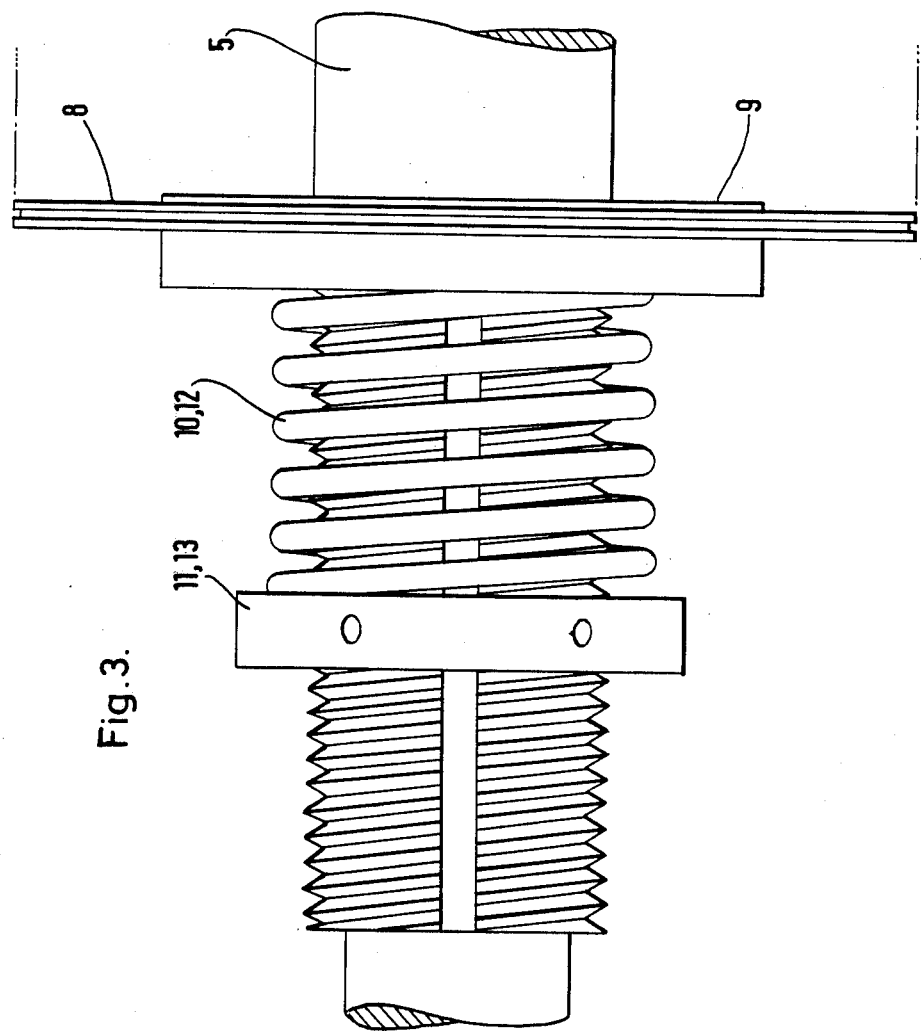

CONVEYORS

BACKGROUND OF THE INVENTION

This invention relates to conveyors of the endless belt type.

The invention is particularly concerned with so-called "low density" conveyors in which the conveying surfaces are perforated or "open" to a substantial extent. The belts of such conveyors are frequently made of mesh material, e.g. wire mesh.

SUMMARY OF THE INVENTION

It is the main object of the present invention to provide a conveyor of the low density type which is cheaper to construct and easier to clean than known conveyors.

In accordance with the invention, a conveyor comprises a pair of spaced roller assemblies, each roller assembly comprising an equal number of side-by-side independently rotatable co-axial guide pulleys or grooved discs. An endless wire is wrapped around the roller assemblies to provide upper and lower flights therebetween, each flight comprising parallel spaced-apart lengths of the wire. The wire extends between the assemblies in a manner such that a wire; length extending from a first pulley in a first one assembly is entrained around the pulley in the second assembly next adjacent the pulley corresponding to and aligned with the first plley in the; first assembly, as viewed from one end of the assemblies. Guide means are provided to; direct the wire from the last pulley in one of the assemblies to the first pulley in the other assembly, whereby the wire can move in an endless path. Rotatable drive means to the pulleys of one assembly to cause movement of the conveyor.

Preferably, the drive means comprises a slipping clutch connection to one or both of the end pulleys in one assembly, and the successive pulleys of that assembly are frictionally in engagement to transmit the drive from one to the other while permitting each pulley to rotate at a speed unequal to that of adjacent pulleys.

BRIEF DESCRIPTION OF THE DRAWINGS

A preferred embodiment of the invention will now be described by way of example, with reference to the accompanying drawings wherein:

FIG. 1 is a plan view of a conveyor according to the invention,

FIG. 2 is a side elevation of the conveyor, and

FIG. 3 is an elevation view of a detail of the conveyor on an enlarged scale.

DETAILED DESCRIPTION OF THE INVENTION

As shown in FIGS. 1 and 2, the conveyor comprises two spaced-apart parallel roller assemblies 1 and 2 mounted at opposite ends of a frame 3, and supporting an endless wire 4 which forms the conveying element.

Each roller assembly comprises a shaft 5 carrying a plurality of grooved discs, or pulleys 8, which are spaced apart along the shaft by intervening spacers 9, the pulleys and spacers being freely rotatable on the shaft.

In one of the assemblies 1, the shaft 5 thereof carries a drive pulley or chain wheel 6 at one end connected by a belt or chain to a drive motor 7, the shaft which is driven by the drive pulley or chain wheel being linked by a compression spring 10 to the outermost grooved disc or pulley 8 at one or both ends of the shaft. The spring 10 is compressed between the outermost pulley 8 and a collar 11 on the shaft. The thrust of the clutch spring is transmitted to all the pulleys in turn along the shaft, thus producing a friction drive to all the pulleys from the motor. The shaft of the other assembly 2 also carries at one end thereof a compression spring 12 between an abutment collar 13 and the end pulley 8 which produces an axial thrust transmitted to all the pulleys 8. By this means all the pulleys on each shaft 5 are frictionally connected for common rotation but, due to the lack of a positive drive link between them, they remain capable of rotation at different speeds.

The endless wire 4 extend around the pulleys 8 and between the assemblies 1 and 2 to form upper and lower flights comprised of parallel runs of the wire. The number of pulleys 8 in each assembly is the same, and the wire entrained around any individual pulley in one assembly is entrained around the next adjacent pulley in the other assembly, as viewed from one end of the assemblies. In other words, if the assemblies are referred to as A and B and the pulleys are denoted from one end of each shaft and numbered as 1, 2 ... n, then wire from pulley A1 is wound round B2 and back to A2, then forward to B3, back to A3 and so on. The remaining length of wire between the two opposite end pulleys, e.g. A1, B . . . n is aligned by spaced-apart jockey pulleys, 14 and 15 mounted on the frame 3 below the top flight of the wire so that the directions of the lengths of wire leaving and approaching the end pulleys is substantially at right angles to the shaft axes.

The top flight of wire forms a conveying surface of low density, and since the supporting elements of this surface, i.e. the wire lengths are all parallel and no cross wires are involved, the cleaning of the conveyor is much simpler than is the case with mesh or perforated conveyor belting. Furthermore, a conveyor according to the invention, may be "intermeshed" with another such conveyor adjacent thereto by placing a roller assembly of the adjacent conveyor between the assemblies of the first conveyor and arranging the assemblies so that the wires of one lie in the spaces between the wires of the other. In this way continuity of conveying is achieved without the necessity of steps or bridging devices between successive conveyors. It should also be understood that by mounting the pulleys oblique to the shaft the conveyor ends may be angularly disposed.

Since the discs or pulleys at each end of the conveyor are capable of rotating at different speeds, it is not necessary to achieve precise diametrical equality of the discs, since each disc can independently adjust its rotational speed to suit the line speed of the wire.

In order to tension the wire 4, bearing blocks 16 carrying the ends of the shaft 5 of assembly 2 are located in slides 17 in the frame 3 and are biased away from the assembly 1 by springs 18 bearing on abutments 19 adjustably mounted on slide rods 20 attached to the bearing blocks.

What we claim is:
1. A conveyor comprising:
   first and second spaced-apart roller assemblies, each roller assembly including an equal number of coaxial pulleys, each of the pulleys in each said assembly being mounted so as to be capable of independent rotation at a speed differing from that of any other of the remaining pulleys of the respective said assembly;

an endless wire wrapped around said roller assemblies to form upper and lower flights therebetween, each flight comprising parallel spaced-apart lengths of said wire, said wire extending between said assemblies in a manner such that a wire length extends from a given pulley in said first assembly to a pulley in said second assembly next adjacent a pulley thereof corresponding to and aligned with said given pulley in said first assembly, as viewed from one end of said assemblies;

guide means for directing said wire from the last pulley in one of said assemblies to the first pulley in the other of said assemblies, as viewed from said one end of said assemblies; and drive means operatively connecting all of the pulleys of one of said assemblies for causing movement of said endless wire along said assemblies by rotation of said pulleys of said one assembly at relatively different speeds.

2. A conveyor as claimed in claim 1, wherein each said assembly further includes a shaft, said pulleys being mounted on said shaft, intervening spacers positioned between each adjacent pair of pulleys, and slip clutch means connected to at least one end of said shaft for urging said pulleys into slipping frictional engagement, said clutch means comprising a collar fixed to said shaft and a compression spring mounted about said shaft between said collar and an endmost of said pulleys.

3. A conveyor as claimed in claim 2, wherein the position of said collar on said shaft is adjustable to vary the thrust provided by said compression spring.

4. A conveyor as claimed in claim 2, wherein said drive means is drivingly connected to the shaft of one of said assemblies.

5. A conveyor as claimed in claim 1, further comprising means for tensioning said wire.

6. A conveyor as claimed in claim 5, wherein said tensioning means comprises means for resiliently urging said assemblies apart.

7. A conveyor as claimed in claim 1, wherein the pulley axes of said assemblies are parallel.

* * * * *